United States Patent [19]

Raufast

[11] Patent Number: 5,082,634

[45] Date of Patent: Jan. 21, 1992

[54] GAS DISTRIBUTION PLATE FOR FLUIDIZATION

[75] Inventor: Charles Raufast, Saint Julien les Martigues, France

[73] Assignee: BP Chemicals Limited, London, England

[21] Appl. No.: 550,209

[22] Filed: Jul. 10, 1990

Related U.S. Application Data

[63] Continuation of Ser. No. 157,168, Feb. 11, 1988, abandoned, which is a continuation of Ser. No. 862,284, May 12, 1986, abandoned.

[30] Foreign Application Priority Data

May 13, 1985 [FR] France .................. 85 07180

[51] Int. Cl.$^5$ .................. B01J 8/44; F27B 15/09
[52] U.S. Cl. .................. 422/143; 34/57 A; 118/DIG. 5; 422/311; 431/7; 431/170; 432/15; 432/58
[58] Field of Search .......... 422/143, 311, 134; 34/57 A; 431/7, 170; 432/15, 58; 118/DIG. 5

[56] References Cited

U.S. PATENT DOCUMENTS

| | | |
|---|---|---|
| 2,906,608 | 9/1959 | Jequier et al. .................. 422/143 |
| 2,924,489 | 2/1960 | Beckmann . |
| 3,403,941 | 10/1968 | Solt . |
| 3,829,983 | 8/1974 | White .................. 422/143 |
| 4,062,656 | 12/1977 | Blaser et al. .................. 422/143 X |
| 4,330,502 | 5/1982 | Engström .................. 422/143 |
| 4,359,326 | 11/1982 | Hoffert et al. .................. 422/311 X |
| 4,571,326 | 2/1986 | Bischoff et al. .................. 422/311 X |

FOREIGN PATENT DOCUMENTS

| | | |
|---|---|---|
| 88655 | 9/1983 | European Pat. Off. . |
| 11549 | 3/1974 | Japan .................. 422/143 |
| 406980 | 8/1966 | Switzerland . |

Primary Examiner—Robert J. Warden
Assistant Examiner—Amalia Santiago
Attorney, Agent, or Firm—Brooks Haidt Haffner & Delahunty

[57] ABSTRACT

The present invention relates to a fluidized bed apparatus comprising a fluidization grid arranged in the lower part of this apparatus, this grid being provided at its center with a circular aperture communicating with a discharge chamber and occurring in the form of a surface of revolution consisting of the joined lateral surfaces of at least two coaxial truncated cones of revolution, virtual vertices of which are oriented downwards.

24 Claims, 3 Drawing Sheets

GAS DISTRIBUTION PLATE FOR FLUIDIZATION

This application is a continuation of application Ser. No. 07/157,168, filed Feb. 11, 1988 now abandoned which is a continuation of application Ser. No. 06/862,284, filed May 12, 1986 now abandoned.

The present invention relates to a fluidised bed apparatus comprising a fluidisation grid (i.e. a gas distribution plate) with a plurality of surfaces having different slopes, this fluidisation grid being in communication with a withdrawal chamber, and also the application of this apparatus to various processes comprising the use of a fluidised bed.

It is known that a solid in powder form is brought into fluidisation in a rising gas stream when the whole of the solid and gaseous phases form a dense and homogeneous bed possessing the apparent characteristics of a fluid. Fluidising a solid in powder form is generally an easy operation, when the speed of the gas stream is adapted to the particle size of the powdery solid. It requires regular distribution of the fluidising gas in the bed of fluidised solid. This distribution is commonly obtained by a fluidisation grid arranged in the bottom part of the fluidised bed apparatus.

Such a fluidisation grid is a device provided with apertures and the gas stream introduced beneath the grid has to be distributed evenly through these apertures.

In numerous industrial applications employing the fluidisation technique, the fluidisation grid is provided with an outlet permitting of the discharge of the manufactured products, either continuously or at the end of the operation if the process is discontinuous. This is the case in particular for processes of granulation of solid substances in powder form, such as chemical fertilizers, cement, lime, glass powder, abrasive substances, mineral or organic substances, combustible substances, food products or pharmaceutical products. In other processes employing the fluidisation technique, it is important to be able to discharge rapidly from the fluidised bed reactor agglomerates formed accidently by sticking or melting of several solid particles; in view of their size, these agglomerates cannot be maintained in fluidsation and are deposited on the fluidisation grid; at the end of a time of varying length the accumulation of these agglomerates may thus bring about the clogging of the apertures in this grid.

In particular agglomerates may appear in processes of coal gasification by fluidisation. In this case it is essential to be able to extract from the fluidised bed reactor the coal ash which is more or less softened by the effect of the temperature and which has a tendency to bring about sticking of the granules. Thus these ashes must be discharge as rapidly as possible before the agglomerates of ash troublesome dimensions.

Agglomerates may also form in processes of polymerisation or copolymerisation in the gas phase of ethylenically unsaturated monomers, when operating in a fluidised bed apparatus in the presence of one or more solid catalysts or initiators leading to the formation of particles of polymer which enlarge as the reaction proceeds, these polymer particles being maintained in the fluidised condition by a rising gas stream containing the said ethylenically unsaturated monomers. As the polymerisation or copolymerisation reaction is exothermic, hot spots may be produced and lead, when the locally prevailing conditions in the fluidised bed allow, to a softening of the polymer particles or copolymer particles and to the formation of agglomerates.

It is known from European Patent Application No. 0088655 to polymerise or to copolymerise alpha-olefins in a fluidised bed, in a fluidised bed reactor comprising in its bottom part a fluidisation grid with an opening connected to a vertical evacuation piping, this piping being equipped with a high-speed valve and being connected to a discharge vessel. A gas inlet is connected to the vertical piping, at a place located between the valve and the fluidisation grid. Although this appartus is satisfactory for evacuating entirely or partially the fluidised bed contained in the fluidised bed reactor, when operated under the conditions indicated in the said Patent Application, it has been found that the volume of the discharge vessel could become unreasonably large when the fluidised bed reactor possesses a relatively large diameter, or about 2 meters or more, and is equipped with a horizontal fluidisation grid.

It has also been proposed to employ a fluidised bed apparatus whose principal element has the form of a cylinder with a vertical axis of revolution, this apparatus comprising in its lower part a fluidisation grid having the form of a truncated cone, provided at its centre with an aperture communicating directly with a discharge pipe connecting the fluidised bed with the outside. The funnel shape of the fluidisation grid corresponds to the lateral surface of a truncated cone of revolution, the virtual vertex of which is oriented downwards, the axis of which is vertical and the generatrix forms with the horizontal plane an angle which is generally high, in order to favour the discharge from the fluidised bed apparatus of the granules or agglomerates deposited on the grid and which slide under the action of gravity along the wall of the fluidisation grid to the lowest point, where the aperture communicating with the discharge pipe is situated. In such an apparatus, it is also known to use a fluidisation grid having the form of a truncated cone, the virtual vertex of which is oriented downwards, and which is connected to the cylindrical body of the fluidised bed apparatus by a small peripheral portion forming with the horizontal plane a high angle, of 60° at least. The fluidisation grid communicates with the outside by means of a discharge pipe. However, it has been observed that the use of such fluidisation grids causes in the fluidised bed a heterogeneity which is the more pronounced, the higher the angle of the generatrix of the cone and the larger the size of the fluidised bed apparatus. Thus for industrial scale fluidised bed apparatus having the form of a cylinder of revolution with a vertical axis and a radius at least equal to 0.5 meter and generally over 1 meter, the difference in level existing between the centre and the periphery of a fluidisation grid of this type becomes considerable by comparison with the height of the fluidised bed, which leads to a pressure drop of the fluidised bed which is appreciably lower at the periphery than at the centre. Because of this, it is found that preferential passages of the fluidisation gas through the fluidised bed are produced, a phenomenon known as "channelling". These preferential passages, in the case mentioned above, are localised along the walls of the fluidised bed apparatus, which brings about the formation of a poorly agitated zone in the centre of the fluidised bed and consequently favours the formation of agglomerates in this zone. Moreover, the throughput of the rising gas stream, which is higher in the vicinity of the wall than at the centre of the fluidised bed, disturbs the descending flow of the solid particles and leads to hydrodynamic instability phenomena, which may become prejudicial to the good operation of the fluidised bed apparatus.

A fluidised bed apparatus has now been found which comprises a fluidisation grid making it possible to solve the above mentioned difficulties namely by facilitating the rapid discharge from the apparatus of granules or agglomerates deposited on the grid, into a discharge chamber and without promoting the appearance in the fluidised bed of "channelling" phenomena. This fluidisation grid is particularly well adapted to large-dimensioned fluidised bed apparatus.

The present invention therefore relates to a fluidised bed apparatus in the form of a cylinder with a vertical axis of revolution and a radius $R_2$, comprising in its lower part a fluidisation grid provided at its centre with a circular aperture of radius r communicating with a discharge pipe, this apparatus being characterised in that the discharge pipe communicates, via a full-flow rapid opening valve, with a discharge chamber, the latter being provided with outlet means, and in that the fluidisation grid has the form of a surface of revolution comprising the joined lateral surfaces of at least two coaxial truncated cones of revolution, $TC_1$ and $TC_2$ the virtual vertices of which are oriented downwards:

the truncated cone revolution $TC_1$, comprising a generatrix forming with the horizontal plane an angle $A_1$ at most equal to 15° and two bases consisting of circles with radii r and $R_1$, $R_1$ being greater than r, the truncated cone of revolution $TC_2$, comprising a generatrix forming with the horizontal plane an angle $A_2$ greater than the angle $A_1$ and at most equal to 30° and two bases consisting of circles with radiae $R_1$ and $R_2$, such that $$0.2 \leq R_1/R_2 \leq 0.8$$

and preferbly such that $$0.4 \leq R_1/R_2 23\ 0.6$$

The central part of the fluidisation grid, consisting of the lateral surface of $TC_1$, is characterised by two horizontal circular bases. The smaller of these two bases corresponds to the central aperture of the fluidisation grid. It consists of a circle with radius r, preferably identical to the radius of the discharge pipe. The larger of these two bases consists of a circle with radius $R_1$, greater than the radius r, but smaller than the radius $R_2$ of the fluidised bed apparatus. The angle $A_1$ may be equal to 0°; in this case the lateral surface of $TC_1$ becomes a plane and horizontal ring composed of the surface comprised between two co-planar circles with radii r and $R_1$.

The joined part, situated beyond the central part of the fluidisation grid, consists of the lateral surface of the truncated cone of revolution $TC_2$, which is characterised by a generatrix forming with the horizontal plane an angle $A_2$ greater than the angle $A_1$, preferably greater than 10°, and at most equal to 30°, preferably at most equal to 25°. It has in fact been observed that when the angle $A_2$ is less than or equal to the angle $A_1$, and in particular less than 10°, the granules or agglomerates which may be deposited on the fluidisation grid or present in its vicinity cannot be effectively discharged outside the fluidised bed via the central aperture. It has been observed, in fact, that the gas jet leaving the orifices of the grid forms an obstacle to the sliding of the granules or agglomerates onto the fluidisation grid, when the angle $A_2$ is insufficient. Moreover, when the angle $A_2$ is too great, in particular 30°, the appearance of "channelling" phenomena is noted in a zone of the fluidised bed situated along the walls of the fluidised bed apparatus employed on an industrial scale. On the contrary, the use of a fluidisation grid which comprises in accordance with the invention the lateral surface of a truncated cone of revolution, $TC_2$, having an angle $A_2$ greater than the angle $A_1$ and at most equal to 30°, makes it possible to both guarantee excellent homogeneity in the fluidised bed and to favour the rapid discharge of all the granules or agglomerates which may be deposited on the grid or present in its vicinity.

The part of the fluidisation grid composed of the lateral surface of the truncated cone of revolution $TC_2$ is also characterised by two horizontal circular bases. The larger of these two bases corresponds to the horizontal section of the fluidised bed apparatus, consisting of a circle with radius $R_2$. The smaller base of $TC_2$, consisting of the circle with radius $R_1$, is identical to the larger base of $TC_1$, so that the lateral surface of $TC_1$ and $TC_2$ are joined. The circle with radius $R_1$ is thus the common base of $TC_1$ and $TC_2$, and the value of the radius $R_1$ is chosen such that the ratio $R_1/R_2$ is equal at least to 0.2 and most to 0.8. In fact, it has been observed that when the ratio $R_1/R_2$ is less than 0.2 "channelling" phenomena may appear in the fluidised bed along the walls of the fluidised bed apparatus. On the other hand, when this ratio is greater than 0.8, it is found that any granules or agglomerates deposited on the fluidisation grid or present in its vicinity are liable to stagnate for a relatively long period in this zone of the fluidised bed, to attain troublesome dimensions and accumulate in large quantities.

The fluidisation grid described above occurs in the form of a surface of revolution consisting of the joined lateral surfaces of two coaxial truncated cones of revolution, $TC_1$ and $TC_2$. However, it is not intention to limit the scope of the present invention to a fluidisation grid comprising only two lateral surfaces of truncated cones; in fact, one may also employ fluidisation grids consisting of the joined lateral surfaces of a number of coaxial truncated cones of revolution, comprising one or more truncated cones of revolution complying with the definition of the truncated cone of revolution $TC_1$ and one or more truncated cones of revolution complying with the definition of a truncated cone of revolution $TC_2$ the virtual vertices being oriented downwards. The truncated cones of revolution of type $TC_1$ are arranged joined between the circular bases with radii comprised between the extreme values r and $R_1$; the large base of each of these truncated cones constitutes at the same time the smaller base of the truncated cone immediately following in the direction going from the centre towards the periphery of the fluidisation grid. Moreover, the truncated cones of revolution of type $TC_1$ have a generatrix forming with the horizontal plane an angle $A_1$ at most equal to 15° and preferably at most equal to 10°. Preferably the value of the angle $A_1$ of the truncated cones increases as the truncated cones of revolution of the type $TC_1$ succeed each other in the direction going from the centre towards the periphery of the grid. Likewise the truncated cones of revolution of type $TC_2$ are arranged joined between the circular bases with a radius comprised between the extreme values $R_1$ and $R_2$ the large base of each of these truncated cones constituting at the same time the smaller base of the truncated cone immediately following in the direction going from the centre towards the periphery of the fluidisation grid. They also have a generatrix forming with the horizontal plane and angle $A_2$ greater than the greatest value of $A_1$ preferably greater than 10° and at most equal to 25°, preferably at most equal to 20°. Preferably the value of the angle $A_2$ increases as the truncated cones of revolution of type $TC_2$ succeed each other in the direction going from the centre towards the periphery of the grid.

However, in order to produce a fluidisation grid of this type in a practical and inexpensive manner, it is preferable that the number of truncated cones of revolution should be limited for each of the truncated cones of revolution of types $TC_1$ and $TC_2$ to a value comprised between 1 and 3.

The fluidisation grid is pierced with apertures, the number, dimension and arrangement of which comply with the relevant technical standards. In particular, the speed of the gas stream circulating through the apertures must be sufficient to prevent the solid particles making up the fluidised bed from falling through these apertures; this speed is generally of the order of a few meters per second, or several tens of meters per second, for example comprised between 5 and 50 meters per second. Moreover, the total surface area of the apertures of the grid, or what is called the admission surface of the grid, is generally calculated in such a way that the ratio of the admission surface area to the total surface area of the grid is less than 1/10 and generally comprised between 1/20 and 1/100. The apertures may be simple cylindrical perforations, that is to say having the form of a cylinder of revolution whose axis forms with the plane of the grid an angle generally comprised between 30° and 90° preferably close to 90°. The diameter of the apertures is generally comprised between 2 and 20 millimeters, depending on the fluidisation conditions, the size of the particles to be fluidised, the devices for introduction and discharge of these particles. The apertures of the fluidisation grid may also have the form of a slit, a cone, a tubule provided with a nozzle or covered with a cap. The apertures are also generally arranged regularly on the fluidisation grid, for example as a network of the centred hexagon type, each aperture thus being at the vertex of an equilateral triangle with a side of 10 to 100 mm.

In the present invention the circular aperture of radius r communicates with a discharge pipe provided with a full-flow rapid-opening valve, this discharge pipe connecting the fluidised bed to a discharge chamber arranged beneath the valve. The discharge of the granules or agglomerates which may be deposited on the fluidisation grid or are present in its vicinity may be effected by opening the valve rapidly, the outlet means of the discharge chamber being closed, then closing the said valve, and after any degassing, collecting the granules or agglomerates via the said outlet means. This arrangement is particularly advantageous when the fluidised bed apparatus is operated under a pressure greater than atmospheric pressure.

In addition, it has suprisingly been found that the form of the fluidisation grid is related to a certain extend with the discharge chamber. More especially, the value of the radius $R_1$ of the circle constituting the common base of the two truncated cones of revolution $TC_1$ and $TC_2$, is an important characteristic of the fluidisation grid in relation to the volume (V) of the discharge chamber. It has been found that it is advantageous to select a radius $R_1$ such that:

$$R_1/(V)^{\frac{1}{3}} \leq 0.8$$

When this ratio is greater than 0.8, it is frequently observed that any granules or agglomerates present on the fluidisation grid are not always totally discharged; the remaining particles or agglomerates are then liable to attain considerable dimensions and to clog the fluidisation grid. It has been observed that in certain processes where the powdery solid which has been fluidised consists of slightly sticky particles liable to agglomerate with each other easily, it is preferable that the ratio $R_1/(V)^{\frac{1}{3}}$ should be such that:

$$0.4 \leq R_1/(V)^{\frac{1}{3}} \leq 0.7$$

The ratio between the volume of the fluidised bed apparatus and that of the discharge chamber is preferably 1000:1 and 10:1, and most preferably comprised between 200:1 and 30:1.

The discharge pipe has an internal radius preferably identical to the radius r of the central aperture of the fluidisation grid. The value of the radius r is generally comprised between 10 and 1000 times the mean radius of the particles being fluidised in the fluidised bed apparatus, this ratio being preferably comprised between 30 and 300. Too small a radius r would run the risk of clogging the discharge pipe and too great a radius r would run the risk of causing upset in the fluidised bed, such as "channelling" phenomena.

Furthermore, in order to avoid clogging of the discharge pipe, it is recommended to circulate in the latter a rising gas stream having a speed comprised between 5 and 50 times, preferably comprised between approximately 10 and 30 times the minimum speed of gas which would entrain the fludisation of the particles into the said discharge pipe. An inadequate speed might cause clogging of the discharge pipe and too great a speed might risk causing perturbations in the fluidised bed such as "channelling" phenomena. This rising gas stream may be introduced into the discharge pipe by means of a tube leading into it at a point situated above the valve and preferably in its immediate vicinity.

The present invention also relates to a process for using the fluidised bed apparatus, comprising a fluidisation grid and a discharge device such as described above. To maintain the solid particles in the fluidised state in the bed, the speed of the fluidisation gas through the fluidised bed must be greater than the minimum speed of fluidisation $V_{mf}$ of the particles, and preferably comprised between about 1.5 and 10 times and more especially between about 3 and 8 times $V_{mf}$. Moreover, it is preferable for the ratio of the pressure existing in the fluidised bed to that existing in the external part of the full-flow rapid-opening valve, that is to say in the discharge chamber, to be greater than 5, preferably comprised between 10 and 25; the difference between these two pressures may also be greater than 0.4 MPa, preferably comprised between 0.5 and 2.5 MPa. This makes it possible to facilitate rapid and total discharge of the granules or agglomerates which may be deposited on the fluidisation grid or present in its vicinity.

The present invention may be used in processes employing the fluidisation technique, especially in processes of granulation of solid substances in powder form. The apparatus is particularly well suited to fluidisation operating under pressure, and also to powders consisting of particles having a mean diameter comprised between 0.1 and 5 mm, and which may be slightly sticky or liable to agglomerate easily. In this way this apparatus may be used in fluidised bed operations intended for gasifying coal, or more especially for the polymerisation or copolymerisation in the gas phase of one or more ethylenically unsaturated monomers, such as ethylene, propylene, 1-butene, 1-hexene, 4-methyl-1-pentene and 1-octene. The polymerisation or copolymerisation of ethylenically unsaturated monomers may be carried out in the presence of a catalyst system of the Ziegler-Natta type consisting on the one hand of a solid catalyst (a) comprising atoms of a transition metal belonging to group IV, V or VI of the Periodic Table of Elements, halogen atoms and optionally magnesium atoms, and on the other hand of a co-catalyst (b) consisting of an organo-metallic compound of a metal of groups I to III of the said Table. This polymerisation or copolymerisation may also be carried out in the presence of a catalyst comprising a chromium oxide compound, associated with a granular support based on a refractory oxide and activated by thermal treatment at a temperature of at least 250° C. and at most equal to the temperature at which the granular support begins to sinter, under a non-reducing atmosphere, preferably an oxidising atmosphere. It is generally carried out a pressure comprised between 0.5 and 5 MPa and a temperature comprised between 0° and 115° C.

The invention is illustrated in a non-restrictive manner, by means of diagrams represented in FIGS. 1, 2 and 3.

Figure 1:
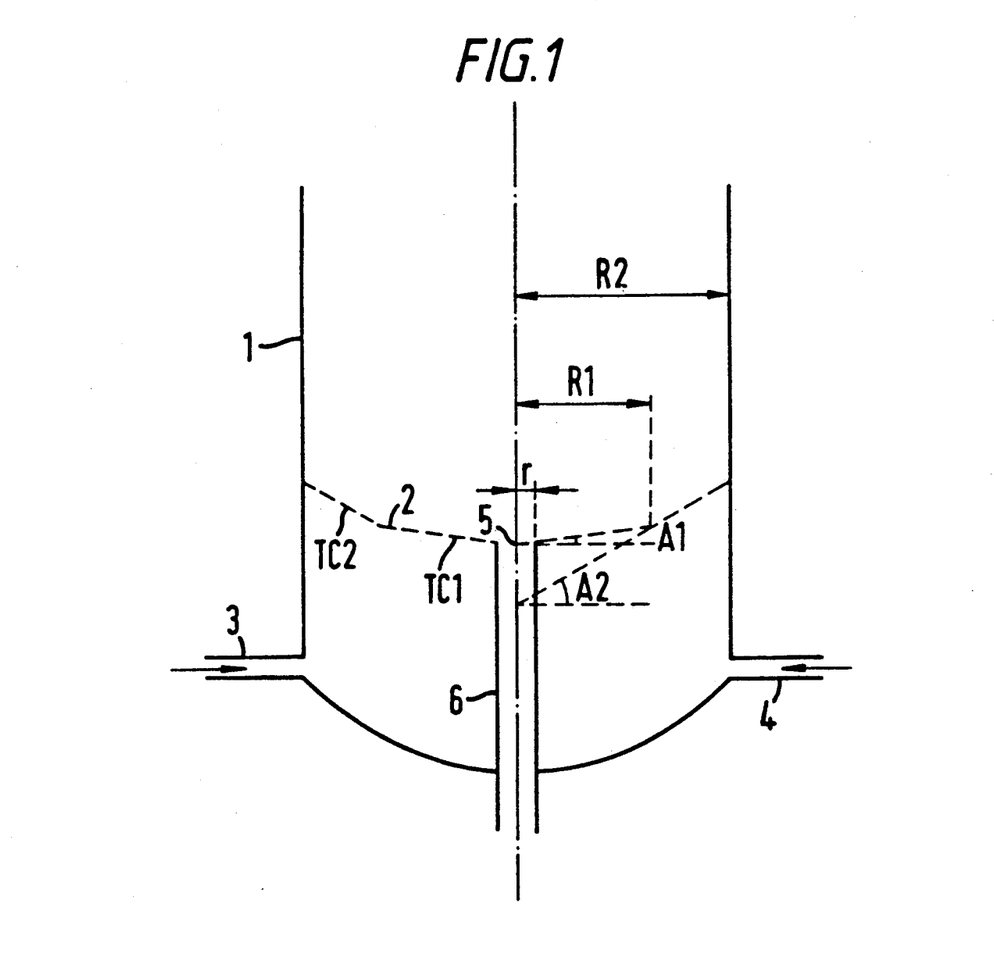
FIG. 1 is a simplified diagram of the lower part of a fluidised bed apparatus comprising a fluidisation grid according to the invention having an angle $A_1$ which is not zero.
Figure 2:
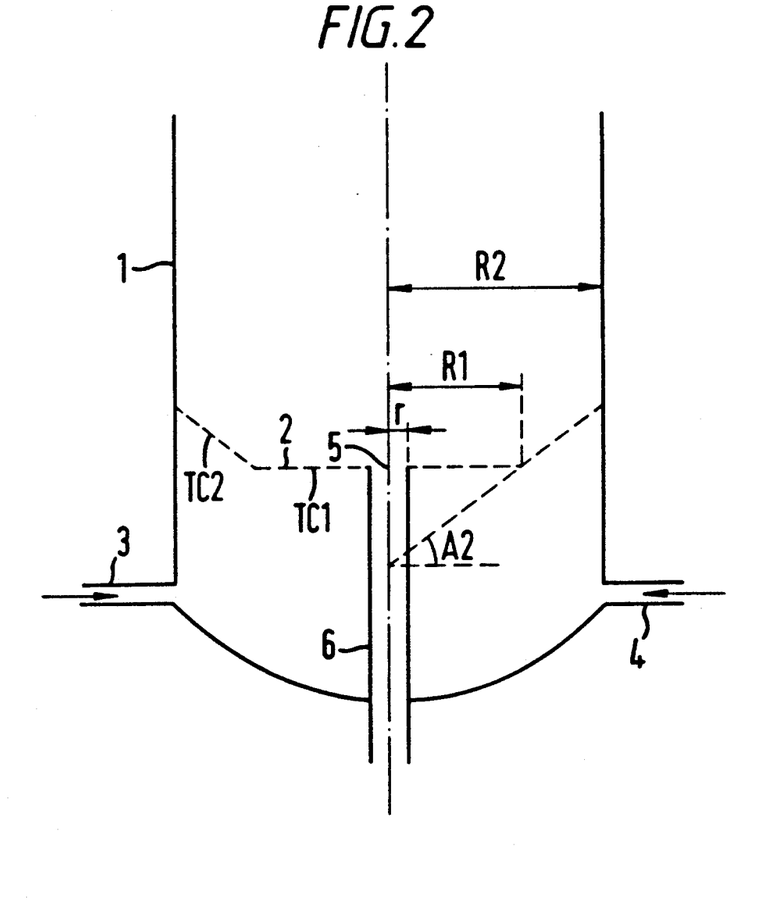
FIG. 2 is a simplified diagram of the lower part of a fluidised bed apparatus comprising a fluidisation grid according to the invention having an angle $A_1$ which is zero.

FIGS. 1 and 2 show in diagram form:
at (1) a fluidised bed apparatus comprising in the vicinity of its base,
at (2) a fluidisation grid consisting of the joined lateral surfaces of two truncated cones of revolution $TC_1$ and $TC_2$,
at (3) and (4) the inlet pipes for fluidisation gas,
at (5) the central aperture of the fluidisation grid communicating,
at (6) with a discharge pipe which makes it possible to withdraw rapidly the granules or agglomerates which may be deposited on the fluidisation grid (2) or present in its vicinity.

In FIGS. 1 and 2:
$A_1$ represents the angle formed by the generatrix of the truncated cone of revolution $TC_1$ with the horizontal plane, this angle being in particular zero in FIG. 2,
$A_2$ represents the angle formed by the generatrix of the truncated cone of revolution $TC_2$ with the horizontal plane,
r represents the radius of the circle corresponding to both the smaller base of the truncated cone of revolution $TC_1$ and the central aperture (5) of the fluidisation grid,
$R_1$ represents the radius of the circle corresponding to the larger base of $TC_1$ and the smaller base of $TC_2$, and
$R_2$ represents the radius of the circle corresponding both to the larger base of $TC_2$ and the horizontal cross-section of the fluidised bed apparatus (1).

Figure 3:
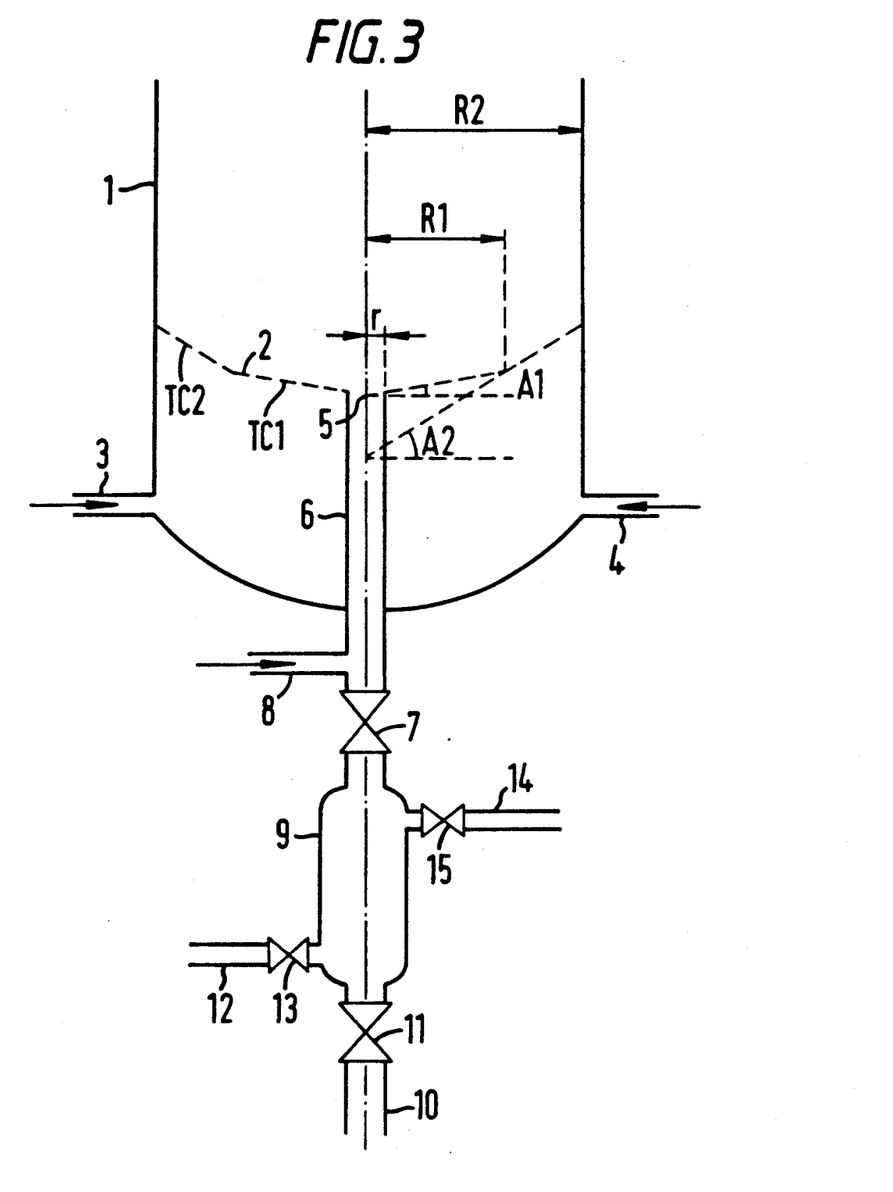
FIG. 3 is a simplified diagram of the lower part of the fluidised bed apparatus operating under pressure and comprising a fluidisation grid and a device employing a discharge chamber.

The fluidised bed apparatus represented in FIG. 3 comprises a fluidisation grid having a central aperture, two inlet pipes for fluidisation gas and a discharge pipe as shown diagramatically by the various elements (1), (2), (3), (4), (5) and (6) in FIGS. 1 and 2; it also comprises:
at (7) a full-flow rapid-opening valve arranged on the discharge pipe (6),
at (8) a gas feed tube making it possible to circulate in the discharge pipe (6) a rising gas stream,
at (9) a discharge chamber provided in its lower part with an outlet pipe (10) capable of being closed by a valve (11),
at (12) piping provided with a valve (13) making it possible to introduced optionally an inert gas into the discharge chamber (9), and
at (14) piping provided with a valve (15) making it possible to lower rapidly the pressure prevailing in the discharge chamber (9) if necessary.

The fluidised bed apparatus represented in FIG. 3 is employed in the following manner, with a view to discharging the granules or agglomerates deposited on a fluidisation grid or present in its vicinity.

The solid substances in powder formed contained in the fluidised bed apparatus (1) being maintained in the fluidised state by the introduction of fluidisation gas into the pipes (3) and (4), gas is continuously introduced into the tube (8) it being possible for this to be identical to or different from the fluidisation gas; the rising speed of the gas in the discharge pipe (6) is comprised between 5 and 50 times the minimum speed of fluidisation of the solid substances in powder form in the discharge pipe (6); preferably the rising speed of the gas in the discharge pipe (6) is such that the solid substances in powder form liable to be present in this pipe (6) are entrained upwards by what is known as the "plug flow" effect; in a flow of the pulsating type, the heat exchanges between gas and solid are very intense, which makes possible an effective cooling of the solid substances in powder form, which may be too hot, and are liable to be present in the pipe.

In order to discharge the granules or agglomerates present on the fluidisation grid (2) or situated in its vicinity, the valve (7) is opened so as to place the discharge pipe (6) in communication with the chamber (9) in which the pressure is appreciably lower than that prevailing in the fluidised bed apparatus (1); the speed of opening of the valve (7) may be chosen such that the gas current created from top to bottom in the discharge pipe (6) is not interfered with by the gas current introduced by the tube (8). Owing to the special form of the fluidisation grid (2), the granules or agglomerates deposited on it are mostly assembled in the central part of the said grid consisting of the lateral surface of $TC_1$; the granules or agglomerates deposited on the part situated beyond the central part of the fluidisation grid, that is to say consisting of the lateral surface of $TC_2$, slide by gravity along this grid into the central part. The rapid opening of the valve (7) produces an effective aspiration of all the particles present on the central part of the fluidisation grid or located in its vicinity. The valve (7) is maintained open for a short period of the order of a few seconds in order to permit filling of the discharge chamber (9). After the closure of the valve (7), the contents of the discharge chamber (9) are discharged to the outside, by the opening of the valve (11). After the closure of the valve (11) and the re-establishment of the desired pressure in the discharge chamber (9), a new discharge operation may be effected.

It may be expedient to equip the discharge chamber (9) with piping (12) and (14) equipped with the valves (13) and (15) respectively. As soon as the discharge chamber (9) has been filled and the valve (7) has closed, it may be preferably in certain cases to open the valve (15) to lower the pressure prevailing in the discharge chamber (9) rapidly, then, by opening the valve (13), and introducing a gas, which may be inert, via the piping (12) to guarantee a circulation of this gas through a discharge chamber (9) during a period sufficient to eliminate, for example, the residuals of the gaseous mixture coming from the fluidised bed apparatus (1). The valves (13) and (15) are then closed before discharging the contents of the discharge chamber (9) by opening the valve (11).

As it has been possible to note after several months of industrial exploitation of a fluidised bed apparatus producing polyethylene in the gas phase according to the invention, it is possible to effect under excellent operating and safety conditions, the rapid discharge outside the fluidised bed of the granules and agglomerates deposited on the grid or present in its vicinity.

EXAMPLE 1

A polymerisation of ethylene in the gas phase is carried out in the fluidised bed device such as represented in FIG. 3, comprising a fluidised bed apparatus (1), serving as polymerisation reactor and having the form of a cylinder revolution with a radius $R_2 = 1.5$ meters and a vertical axis. The lower part of the fluidised bed apparatus (1) comprises a fluidisation grid (2) which communicates at its centre via a circular aperture (5) with radius $r = 0.05$ meters with a discharge pipe (6) having the form of a cylinder of revolution of radius r and a vertical axis. The discharge pipe (6) is provided with a full flow rapid opening valve (7) of the spherical casing type, actuated by a pneumatic control providing its complete opening in approximately 0.5 second. It also comprises a feed tube for gas mixture (8), which is permanently traversed by a throughput of approximately 25 m$^3$/h, this gaseous mixture having the same composition and being at the same pressure and temperature as the gaseous mixture feeding the fluidised bed apparatus via the pipes (3) and (4). The discharge pipe (6) is connected to the discharge chamber (9) of volume V, equal to 1.100 cu metre. This chamber is provided in its lower part with a drainage pipe (10) comprising a full flow valve (11) of the spherical ball casing type. The pressure of 2.1 MPa existing in the fluidised bed apparatus (1) is maintained constant during polymerisation; that existing in the discharge chamber (9) is atmospheric pressure.

A gaseous mixture is circulated through the fluidised bed which comprises 50% by volume of ethylene and 50% by volume of hydrogen, at a temperature of 92° C. This gaseous mixture circulates at the rising speed of 50 cm/sec through the fluidised bed consisting of particles of ethylene being polymerised, having a mean diameter by mass of 650 microns. There is also introduced into the fluidised bed apparatus (1) an olefin polymerisation catalyst used in the form of a prepolymer, catalyst and prepolymer being prepared according to the information in Example 1 of French Patent No. 2405961.

The fluidisation grid (2) consists of the joined lateral surfaces of two coaxial truncated cones of revolution $TC_1$ and $TC_2$, having a generatrix forming with the horizontal plane an angle $A_1$ of 6° and an angle $A_2$ of 12° respectively. The radius $R_1$ of the circle constituting the common base of the two truncated cones of revolution $TC_1$ and $TC_2$ is equal to 0.7 meters. The apertures of the grid have the form of a cylinder of revolution of 3 mm diameter and a vertical axis in relation to the plane of the grid. The ratio of the admission surface area to the total surface area of the grid is equal to 1/34. These apertures are arranged regularly on the fluidisation grid according to a network of the centred hexagon type, each aperture being at the apex of an equilateral triangle having a side of 22 mm.

In order to purge the lower part of the fluidised bed apparatus (1), the following operations are performed without stopping polymerisation:

The valve (7) is opened and this valve is left open for about 10 secs, the valve (11) and the valves (13) and (15) remaining closed, and the gas stream arriving via the tube (8) being maintained at a constant throughput;

The valve (7) is closed, then in order to avoid any risk of continued polymerisation in the discharge chamber (9), the valve (15) is opened in order rapidly to lower the pressure existing in the discharge chamber (9), this pressure thus decreasing from 2.1 MPa to approximately atmospheric pressure;

Next, by opening the valve (13), a current of nitrogen introduced via the piping (12) is circulated for several minutes through the polyethylene powder contained in the discharge chamber (9);

Next the valves (13) and (15) are closed and the contents of the discharge chamber are collected by opening the valve (11); when the discharge chamber (9) is empty the valve (11) is closed.

After these operations it may be found, after stopping the polymerisation and degassing the fluidised bed apparatus, that no agglomerate remains deposited on the fluidisation grid (2) or present in the vicinity of same, and that the use of this fluidisation grid does not favour the formation of agglomerates in the fluidised bed by any "channelling" phenomena.

EXAMPLE 2

Polymerisation of ethylene is carried out by means of an installation identical to that described in Example 1, except for the fact that instead of using a fluidisation grid having an angle $A_1$ of 6° and a radius $R_1$ of 0.7 meter, a fluidisation grid is used having an angle $A_1$ of 0° and a radius $R_1$ of 0.6 metre, this grid being such as represented diagrammatically, in FIG. 2.

The operations described in Example 1 are performed and, after stopping the polymerisation and degassing the fluidised bed apparatus, it is found that no agglomerate remains deposited on the fluidisation grid (2) or present in its vicinity, and that the use of this fluidisation grid does not favour the formation of agglomerates in the fluidised bed.

I claim:
1. Fluidized bed apparatus comprising:

a hollow cylindrical vessel having a vertical cylinder axis and an interior wall surface defining an upper reactor portion of radius $R_2$ and a lower portion;

a fluidization grid for receiving a powder bed, said grid extending from said wall surface toward said axis and disposed intermediate said upper reactor portion and said lower portion and separating said upper reactor portion from said lower portion, said fluidization grid having a central opening substantially coaxial with said axis and of a radius r, a first grid portion $TC_1$, having an upper surface in the shape of a truncated cone and extending radially outwardly and upwardly from said opening and a second grid portion $TC_2$ having an upper surface in the shape of a truncated cone adjoining said upper surface of said first grid portion and extending radially outwardly and upwardly from said first grid portion $TC_1$ to said interior wall surface, both said first grid portion $TC_1$ and said second grid portion $TC_2$ being coaxial with said vertical axis and being disposed with their truncated apices pointing downwardly;

the generatrix of the upper surface of said first grid portion $TC_1$ forming an angle $A_1$ with a horizontal plane substantially perpendicular to said vertical axis, said angle $A_1$ being from 0° to not greater than 15° and said first grid portion $TC_1$ having an upper circular base of radius $R_1$ and an open lower circular base of said radius r;

the generatrix of the upper surface of said second grid portion $TC_2$ forming an angle $A_2$ greater than angle $A_1$, greater than 10° and such that granules or agglomerates deposited on the second grid portion $TC_2$ slide by gravity along the second grid portion to the first grid portion $TC_1$, but not greater than 30° with a horizontal plane substantially perpendicular to said vertical axis and said second grid portion $TC_2$ having an upper circular base of said radius $R_2$ and a lower circular base of said radius $R_1$, whereby said first grid portion $TC_1$ extends from said central opening to said second grid portion $TC_2$ and said second grid portion $TC_2$ extends from said first grid portion $TC_1$ to said interior wall surface;

a discharge pipe extending from exteriorly of said vessel and from below said fluidization grid to said central opening in said fluidization grid;

a discharge chamber exteriorly of said vessel interconnected with said discharge pipe by a full-flow, rapid opening valve, said discharge chamber having a volume (V); and wherein said radius $R_1$ is greater than said radius r, the ratio of said radius $R_1$ to $(V)^{\frac{1}{3}}$ is not greater than 0.8 and the ratio of said radius $R_1$ to said radius $R_2$ is at least equal to 0.2 but not greater than 0.8.

2. Fluidised bed apparatus according to claim 1, characterised in that a gas feed tube leads into the discharge pipe at a point situated above and in the immediate vicinity of the full-flow rapid opening valve.

3. Fluidised bed apparatus according to claim 1, characterised in that the angle $A_2$ is lower than or equal to 25°.

4. A fluidised bed apparatus according to claim 1 wherein the ratio of $R_1$ to $R_2$ is equal or greater than 0.4 and less than or equal to 0.6.

5. Fluidized bed apparatus according to claim 1 wherein the ratio of said radius $R_1$ to $(V)^{\frac{1}{3}}$ is at least equal to 0.4 but not greater than 0.7.

6. In a process for fluidizing a powder in fluidized bed, providing apparatus comprising:

a hollow cylindrical vessel having a vertical cylinder axis and an interior wall surface defining an upper reactor portion of radius $R_2$ and a lower portion;

a fluidization grid extending from said wall surface toward said axis and disposed intermediate said upper reactor portion and said lower portion and separating said upper reactor portion from said lower portion, said fluidization grid having a bed of powder to be fluidized on said fluidization grid, and having a central opening substantially coaxial with said axis and of a radius r, a first grid portion $TC_1$ having an upper surface in the shape of a truncated cone and extending radially outwardly and upwardly from said opening and a second grid portion $TC_2$ having an upper surface in the shape of a truncated cone adjoining said upper surface of said first grid portion $TC_1$ and extending radially outwardly and upwardly from said first grid portion $TC_1$ to said interior wall surface, both said first grid portion $TC_1$ and said second grid portion $TC_2$ being coaxial with said vertical axis and being disposed with their truncated apices pointing downwardly;

the generatrix of the upper surface of said first grid portion $TC_1$ forming an angle $A_1$ with a horizontal plane substantially perpendicular to said vertical axis, said angle $A_1$ being from 0° to not greater than 15° and said first grid portion $TC_1$ having an upper circular base of radius $R_1$ and an open lower circular base of said radius r;

the generatrix of the upper surface of said second grid portion $TC_2$ forming an angle $A_2$ greater than angle $A_1$, greater than 10° and at least equal to the angle which will cause granules or agglomerates deposited on said second grid portion $TC_2$ to slide by gravity along the second grid portion to the first grid portion $TC_1$, but not greater than 30° with a horizontal plane substantially perpendicular to said vertical axis and said second grid portion $TC_2$ having an upper circular base of said radius $R_2$ and a lower circular base of said radius $R_1$, whereby said first grid portion $TC_1$ extends from said central opening to said second grid portion $TC_2$ and said second grid portion $TC_2$ extends from said first grid portion $TC_1$ to said interior wall surface;

a discharge pipe extending from exteriorly of said vessel and from below said fluidization grid to said central opening in said fluidization grid;

a discharge chamber exteriorly of said vessel interconected with said discharge pipe by a full-flow, rapid opening valve, said discharge chamber having a volume (V); and wherein said radius $R_1$ is greater than said radius r, the ratio of said radius $R_1$ to $(V)^{\frac{1}{3}}$ is not greater than 0.8 and the ratio of said radius $R_1$ to said radius $R_2$ is at least equal to 0.2 but not greater than 0.8, said process comprising supplying a fluidizing gas under pressure to said lower part of said vessel and providing a pressure in said bed of powder which is at least five times the pressure in said discharge chamber.

7. A process according to claim 6 wherein the pressure in said bed of powder is at least 5 times the pressure in said discharge chamber.

8. A process according to claim 7 wherein the pressure in said bed of powder is from 10 to 25 times the pressure in said discharge chamber.

9. A process according to claim 6 wherein said powder is coal.

10. A process according to claim 6 wherein said powder comprises a catalyst for the polymerization or copolymerization in the gas phase of ethylenically unsaturated monomers and wherein said fluidizing gas contains and ethylenically unsaturated monomer.

11. A process according to claim 6 wherein said powder is a solid substance to be formed into granules.

12. Fluidized bed apparatus comprising:
a hollow cylindrical vessel having a vertical cylinder axis and an interior wall surface defining an upper reactor portion of radius $R_2$ and a lower portion;
a fluidization grid for receiving a powder bed, said grid extending from said wall surface toward said axis and disposed intermediate said upper reactor portion and said lower portion and separating said upper reactor portion from said lower portion, said fluidization grid having a central opening substantially coaxial with said axis and said opening having a radius r, a first grid portion $TC_1$ having an upper surface, each portion of said upper surface having the shape of a truncated cone and said upper surface extending radially outwardly and upwardly from said opening and a second grid portion $TC_2$ having an upper surface, each portion of the upper surface of said second grid portion having the shape of a truncated cone and said upper surface of said second grid portion adjoining said upper surface of said first grid portion and extending radially outwardly and upwardly from said first grid portion $TC_1$ to said interior wall surface, both said first grid portion $TC_1$ and said second grid portion $TC_2$ being coaxial with said vertical axis and the truncated cone surfaces being disposed with their truncated apices pointing downwardly;
the generatrices of all portions of the upper surface of said first grid portion $TC_1$ forming an angle $A_1$ with a horizontal plane substantially perpendicular to said vertical axis, said angle $A_1$ being at least equal to 0° and not greater than 15°, the angle of the generatrix of a portion of said upper surface of said first grid portion radially outwardly and upwardly of said vertical axis from and next to another portion of said upper surface of said first grid portion being at least equal to the angle of the generatrix of said another portion of said upper surface of said first grid portion and said first grid portion $TC_1$ having an upper circular base of radius $R_1$ and an open lower circular base of said radius r;
the generatrices of all portions of the upper surface of said second grid portion $TC_2$ forming an angle $A_2$ greater than angle $A_1$ and greater than 10° and such that granules or agglomerates deposited on the second grid portion slide by gravity along the second grid portion to the first grid portion $TC_1$, but not greater than 30° with a horizontal plane substantially perpendicular to said vertical axis, the angle of the generatrix of a portion of said upper surface of said second grid portion radially outwardly and upwardly of said vertical axis from and next to another portion of said upper surface of said second grid portion being at least equal to the angle of the generatrix of said another portion of said upper surface of said second grid portion and said second grid portion $TC_2$ having an upper circular base of said radius $R_2$ and a lower circular base of said radius $R_1$, whereby said first grid portion $TC_1$ extends from said central opening to said second grid portion $TC_2$ and said second grid portion $TC_2$ extends from said first grid portion $TC_1$ to said interior wall surface;
a discharge pipe extending from exteriorly of said vessel and from below said fluidization grid to said central opening in said fluidization grid and a discharge chamber exteriorly of said vessel interconnected with said discharge pipe by a full-flow, rapid opening valve, said discharge chamber having a volume (V); and
wherein said radius $R_1$ is greater than said radius r, the ratio of said radius $R_1$ to $(V)^{\frac{1}{3}}$ is not greater than 0.8 and the ratio of said radius $R_1$ to said radius $R_2$ is at least equal to 0.2 but not greater than 0.8.

13. Fluidized bed apparatus according to claim 12 wherein the ratio of said radius $R_1$ to $(V)^{\frac{1}{3}}$ is at least equal to 0.4 but not greater than 0.7.

14. Fluidized bed apparatus according to claim 12 wherein the ratio of $R_1$ to $R_2$ is equal or greater than 0.4 and less than or equal to 0.6.

15. Fluidized bed apparatus according to claim 12, characterized in that a gas feed tube leads into the discharge pipe at a point situated above and in the immediate vicinity of the full-flow rapid opening valve.

16. Fluidized bed apparatus according to claim 12 characterized in that the angle $A_2$ is less than or equal to 25°.

17. Fluidized bed apparatus according to claim 12 wherein both said upper surface of said first grid portion and said upper surface of said second grid portion are rectilinear in cross-section.

18. In a process for fluidizing a powder in fluidized bed, providing apparatus comprising:
a hollow cylindrical vessel having a vertical cylinder axis and an interior wall surface defining an upper reactor portion of radius $R_2$ and a lower portion;
a fluidization grid extending from said wall surface toward said axis and disposed intermediate said upper reactor portion and said lower portion and separating said upper reactor portion from said lower portion, said fluidization grid having a bed of powder to be fluidized on said fluidization grid and having a central opening substantially coaxial with said axis and said opening having a radius r, a first grid portion $TC_1$ having an upper surface, each portion of said upper surface having the shape of a truncated cone and said upper surface extending radially outwardly and upwardly from said opening and a second grid portion $TC_2$ having an upper surface, each portion of the upper surface of said second grid portion having the shape of a truncated cone and said upper surface of said second grid portion adjoining said upper surface of said first grid portion and extending radially outwardly and upwardly from said first grid portion $TC_1$ to said interior wall surface, both said first grid portion $TC_1$ and said second grid portion $TC_2$ being coaxial with said vertical axis and the truncated cone surfaces being disposed with their truncated apices pointing downwardly;
the generatrices of all portions of the upper surface of said first grid portion $TC_1$ forming an angle $A_1$ with a horizontal plane substantially perpendicular to said vertical axis, said angle $A_1$ being at least equal to 0° to and not greater than 15°, the angle of the generatrix of a portion of said upper surface of said first grid portion radially outwardly and upwardly of said vertical axis from and next to another portion of said upper surface of said first grid portion being at least equal to the angle of the generatrix of said another portion of said upper surface of said first grid portion and said first grid portion $TC_1$ having an upper circular base of radius $R_1$ and an open lower circular base of said radius r;

the generatrices of all portions of the upper surface of said second grid portion $TC_2$ forming an angle $A_2$ greater than angle $A_1$, and greater than 10° and such that granules or agglomerates deposited on the second grid portion slide by gravity along the second grid portion to the first grid portion $TC_1$, but not greater than 30° with a horizontal plane substantially perpendicular to said vertical axis, the angle of the generatrix of a portion of said upper surface of said second grid portion radially outwardly and upwardly of said vertical axis from and next to another portion of said upper surface of said second grid portion being at least equal to the angle of the generatrix of said another portion of said upper surface of said second grid portion and said second grid portion $TC_2$ having an upper circular base of said radius $R_2$ and a lower circular base of said radius $R_1$, whereby said first grid portion $TC_1$ extends from said central opening to said second grid portion $TC_2$ and said second grid portion $TC_2$ extends from said first grid portion $TC_1$ to said interior wall surface;

a discharge pipe extending from exteriorly of said vessel and from below said fluidization grid to said central opening in said fluidization grid and a discharge chamber exteriorly of said vessel interconnected with said discharge pipe by a full-flow, rapid opening valve, said discharge chamber having a volume (V); and wherein said radius $R_1$ is greater than said radius r, the ratio of said radius $R_1$ to $(V)^{\frac{1}{3}}$ is not greater than 0.8 and the ratio of said radius $R_1$ to said radius $R_2$ is at least equal to 0.2 but not greater than 0.8;

said process comprising supplying a fluidizing gas under pressure is said lower part of said vessel.

19. A process according to claim 18 which comprises providing a pressure in said bed of powder which is at least five times the pressure in said discharge chamber.

20. A process according to claim 19 wherein the pressure in said bed of powder is from 10 to 25 times the pressure in said discharge chamber.

21. A process according to claim 18 wherein said powder is coal.

22. A process according to claim 18 wherein said powder comprises a catalyst for the polymerization or copolymerization in the gas phase of ethylenically unsaturated monomers and wherein said fluidizing gas contains and ethylenically unsaturated monomer.

23. A process according to claim 18 wherein said powder is a solid substance to be granulated.

24. A process according to claim 18 wherein both said upper surface of said first grid portion and said upper surface of said second grid portion are rectilinear in cross-section.

* * * * *

UNITED STATES PATENT AND TRADEMARK OFFICE
CERTIFICATE OF CORRECTION

PATENT NO. : 5,082,634

DATED : January 21, 1992

INVENTOR(S) : Charles Raufast

It is certified that error appears in the above-identified patent and that said Letters Patent is hereby corrected as shown below:

Col. 1, line 55, change "discharge" to --discharged--;
      line 56, after "ash" insert --reach--;
Col. 3, line 42, change "$0.4 \leq R_1/R_2 23\ 0.6$" to
      $0.4 \leq R_1/R_2 \leq 0.6$--;
Col. 4, line 41, after "not" insert --the--;
Col. 5, line 64, change "extend" to --extent--;
Col. 9, line 16, change "preferably" to --preferable--;

Col. 13, line 7, change "and" to --an--.

Signed and Sealed this

First Day of June, 1993

Attest:

MICHAEL K. KIRK

Attesting Officer      Acting Commissioner of Patents and Trademarks